United States Patent
Ausfeld (10) Patent No.: US 9,473,449 B2
(45) Date of Patent: Oct. 18, 2016

(54) MULTI-PLATFORM COLLABORATION APPLIANCE

(76) Inventor: Jeffrey J. Ausfeld, New York, NY (US)

( * ) Notice: Subject to any disclaimer, the term of this patent is extended or adjusted under 35 U.S.C. 154(b) by 735 days.

(21) Appl. No.: 13/024,606

(22) Filed: Feb. 10, 2011

(65) Prior Publication Data

US 2012/0209906 A1    Aug. 16, 2012

(51) Int. Cl.
G06F 15/16    (2006.01)
H04L 12/58    (2006.01)
H04L 12/18    (2006.01)

(52) U.S. Cl.
CPC ........... *H04L 51/36* (2013.01); *H04L 12/1818* (2013.01); *H04L 12/1895* (2013.01); *H04L 51/20* (2013.01)

(58) Field of Classification Search
CPC ........... H04L 12/1895; H04L 12/1818; H04L 51/20; H04L 51/36
USPC ................................................ 709/204, 205
See application file for complete search history.

(56) References Cited

U.S. PATENT DOCUMENTS

| | | | |
|---|---|---|---|
| 6,158,903 A * | 12/2000 | Schaeffer et al. | 709/204 |
| 6,615,239 B1 | 9/2003 | Berstis | |
| 7,328,243 B2 * | 2/2008 | Yeager et al. | 709/205 |
| 7,379,733 B2 | 5/2008 | Maes et al. | |
| 7,464,137 B2 | 12/2008 | Zhu et al. | |
| 7,647,555 B1 * | 1/2010 | Wilcox | G11B 27/11 715/721 |
| 7,679,518 B1 | 3/2010 | Pabla et al. | |
| 8,296,797 B2 * | 10/2012 | Olstad | G06F 17/30796 725/37 |
| 9,178,957 B2 * | 11/2015 | Pegg | G06F 9/54 |
| 2003/0158864 A1 * | 8/2003 | Samn | G06Q 10/107 |
| 2003/0208534 A1 | 11/2003 | Carmichael | |
| 2004/0034723 A1 | 2/2004 | Giroti | |
| 2005/0204297 A1 | 9/2005 | Banatwala et al. | |
| 2005/0276270 A1 | 12/2005 | Buinevicius et al. | |
| 2005/0286443 A1 | 12/2005 | McMillen et al. | |
| 2006/0053194 A1 * | 3/2006 | Schneider et al. | 709/204 |
| 2006/0095514 A1 | 5/2006 | Wang et al. | |
| 2007/0150512 A1 | 6/2007 | Kong et al. | |
| 2007/0233785 A1 * | 10/2007 | Abraham et al. | 709/204 |
| 2007/0271337 A1 | 11/2007 | Olson | |
| 2008/0209330 A1 * | 8/2008 | Cruver | G06F 15/16 715/733 |
| 2009/0222741 A1 | 9/2009 | Shaw et al. | |
| 2009/0234721 A1 | 9/2009 | Bigelow et al. | |
| 2010/0235446 A1 * | 9/2010 | Hehmeyer et al. | 709/205 |

* cited by examiner

*Primary Examiner* — Kevin Bates
*Assistant Examiner* — Nazia Naoreen
(74) *Attorney, Agent, or Firm* — Hunter E. Webb; Keohane & D'Alessandro PLLC (57) ABSTRACT

The invention contains a private self-aware network. The network will use multi-point Bluetooth technology or Wi-Fi or a direct connection (though not limited to any of these technologies) to provide this capability. By enabling the invention to detect other invention connections, accessories, and users, it can perform many of the network functions common in today's marketplace. A few examples include instant send or sharing of files to or with anybody linked through the invention or to a specific device. A chat window can be created to talk to specific people or to groups of people on the invention network. Registration information for conference discussion sessions can provide files to update customer databases or CRM type systems. Classroom attendance and assignments can be passed between the teacher and student. These are just a few examples of what can be done using this new network feature but the invention is not limited to just these. Due to a limited number of electrical wall sockets, a daisy chain option can be incorporated into the invention as well. The user has the option for directly connecting the power input of all the inventions in the room together rather than plugging in each one individually. There are four basic settings: Business (coffee shop), Active Conference, Active Classroom, and Professional Client. These offer standard settings usually expected in that kind of environment.

26 Claims, 6 Drawing Sheets

MULTI-PLATFORM COLLABORATION APPLIANCE

FIELD OF THE INVENTION

This invention relates generally to multi-platform collaboration computer systems and more specifically to out-of-box solutions for multi-platform collaboration conferences among many other applications.

BACKGROUND OF THE INVENTION

Multimedia presentations often employ a dynamic array of technologies, ranging from media on the internet, to slides, to text written on whiteboards and blackboards, to content verbally presented by a speaker. Information a speaker or presenter wishes to distribute to the participants of a presentation may be distributed through any of these venues, or made available electronically. Additionally, seminar participants choose a wide variety of electronic devices with which to interact with the presentation, such as laptop computers, PDAs (Personal Digital Assistant), cell phones, and digital readers. Nearly all mobile devices come with either wired or wireless Ethernet, USB, or Bluetooth forms of communication. Each generally has their own separate software and hardware which is dependent upon the user, and or device. Sharing of information between dissimilar devices is generally slow and limited. Likewise, distribution of digital information to participants via traditional methods such as email and digital drop boxes can be time consummating, particularly in classroom situations where time efficiency is a premium.

SUMMARY OF THE INVENTION

The invention contains a private self-aware network. The network will use multi-point Bluetooth technology or Wi-Fi or a direct connection (though not limited to any of these technologies) to provide this capability. By enabling the invention to detect other invention connections, accessories, and users, it can perform many of the network functions common in today's marketplace. A few examples include instant send or sharing of files to or with anybody linked through the invention or to a specific device. A chat window can be created to talk to specific people or to groups of people on the invention network. Registration information for conference discussion sessions can provide files to update customer databases or CRM type systems. Classroom attendance and assignments can be passed between the teacher and student. These are just a few examples of what can be done using this new network feature but the invention is not limited to just these. Due to a limited number of electrical wall sockets, a daisy chain option can be incorporated into the invention as well. The user has the option for directly connecting the power input of all the inventions in the room together rather than plugging in each one individually. There are four basic settings: Business (coffee shop), Active Conference, Active Classroom, and Professional Client. These offer standard settings usually expected in that kind of environment.

In one embodiment, there is a method for communicating in a collaborative application with portable and fixed computer based hardware. In a first step, a connection is made with a set of computerized devices to a computer network. In a second step, functionality and data access are provided between the set of computerized devices, the functionality and data access being independent of a set of platforms of the set of computerized devices In a second embodiment, there is a system for communicating in a collaboration style application with portable and fixed computer based hardware, comprising: a bus; a processor coupled to the bus; and a memory medium coupled to the bus. The memory medium comprises instructions to connect a plurality of user devices to a network of the system; and provide functionality and data access between the devices of the plurality.

In a third embodiment, there is a computer-readable medium storing computer instructions, which when executed, enables a computer system to communicate in a collaboration style application with portable and fixed computer based hardware. The instructions further enable the computer system to connect a plurality of user devices to a computer network; and provide functionality and data access between the devices of the plurality.

In a fourth embodiment, there is a method for deploying a collaboration device tool for use in a computer system that is used to communicate in a collaboration style application with portable and fixed computer based hardware. In this embodiment, a computer infrastructure is provided and is operable to connect a plurality of user devices to a computer network; provide functionality and data access between the devices of the plurality; and capture and store at least one file, video, chat, IM, comment, audio, attendance log, or polling file, on a device of the plurality of user devices.

BRIEF DESCRIPTION OF THE DRAWINGS

These and other features of the invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be understood that a "plurality" will constitute one or more of an item being discussed. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to "migration points" and associated method and calculation tool. In generally, migration point is a number that represents an evaluation of the size and complexity of performing a migration, port or refresh of an application from a legacy platform to a new target platform. When migration points are applied to applications across a portfolio, they provide a relative measurement of the size and complexity to perform the migration. Additionally, this measurement can be used as the level of output in calculating migration productivity, (i.e., migration points divided by Person-Months, similar to how Software Productivity utilized Function Points). In a typical embodiment, the migration point total is based on a set of qualitative migration points and a set of quantitative migration points, which are based on various technical aspects of the involved application, operating system, and hardware.

The intention of the present invention is to manage a group collaboration environment through a dedicated hardware and software device, and extend the devices capabilities through a host of accessories, primarily but not limited to, hardware and software based.

Nearly all mobile devices come with either wired or wireless Ethernet, USB, or Bluetooth forms of communication. Each generally has their own separate software and hardware which is dependent upon the user, and or device. It is this invention's primary intention to communicate freely with all parties regardless of hardware or software and most importantly, allow all the users to then communicate with each other in any way the group or user deems appropriate. User devices may include, but are not limited to: a computer, a laptop, a mobile phone, a PDA (Personal Digital Assistant), an electronic reader, and a tablet computer. These devices are also examples of computerized devices, although computerized devices are not limited to such.

Currently available technology lacks the capability of networking through a private self-aware network, communicating with any device as described above, and the accessories mentioned for the intended collaboration based application. The current limitations of sharing information from one device to another have been the norm but the present invention offers a solution to that trend.

Figure 1:
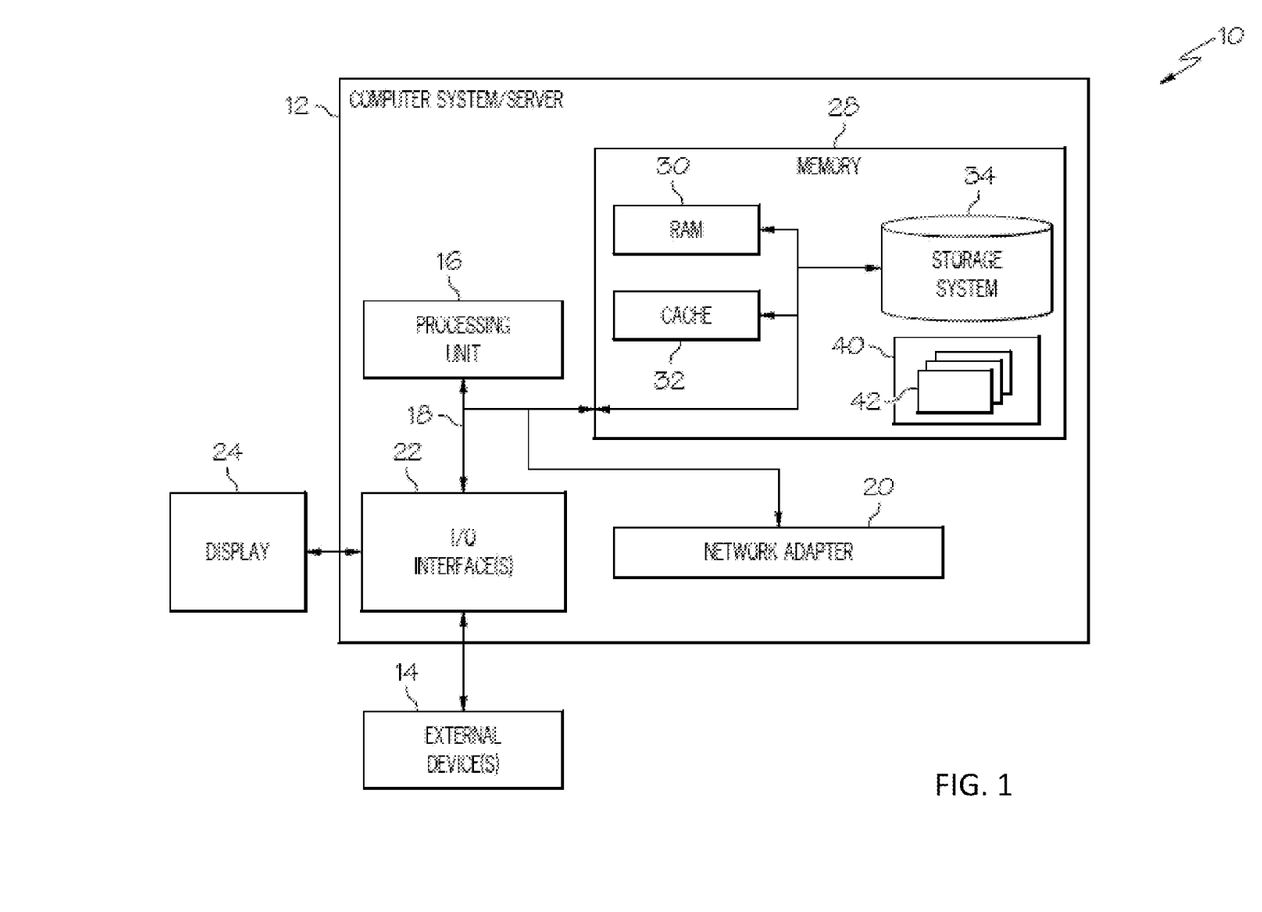
FIG. 1 shows a computerized implementation for communicating in a collaboration style application according an embodiment to the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Migration point program/utility 40, having a set (at least one) of program modules 42, may be stored in memory 28 by way of example, and not limitation, as well as an operating system, one or more application programs, other program modules, and program data. In general, migration point program 40 performs the function of the present invention as described herein. For example, migration point program 40 will compute a migration point total indicating a complexity of a proposed application migration, and provide various outputs (e.g., spreadsheets, charts, etc.) Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The present invention is intended to address the multi-platform collaboration requirements of, but not limited to, corporations and schools. The main device has, depending on the package, but is not limited to, direct USB connections for both master and slave type devices, wireless Ethernet access point, wireless Ethernet peer to peer, wired Ethernet lan, VGA/RCA/HDMI video output, Audio Line in, Audio Line out, Infrared Port, Cellular communication, Cellular communication prevention, and the latest in Bluetooth technology. All of these inputs and outputs should be considered best of breed and can be upgraded and either added to or subtracted within the spirit of the invention. The hardware may contain a touch screen interface in some packaged applications.

The device is an out-of-box solution for a multi-platform collaboration conference among many other applications, both user driven and potential client driven. Multi-platform being defined, but not limited to, PC, Mac, Unix, Linux, Google OS, PalmOS, and Windows CE. It is the intention of the device to be able to communicate with any computer system with, but not limited to, any of the aforementioned input and output examples.

The device comprises both hardware and software which enable the device to communicate to each of its accessories and to multiple main hardware devices, or user devices, via a variety of connection methods both wireless and wired. The main hardware device is furthermore of a server style and creates its own self-aware network which users, with their own privately owned computer equipment, or user devices, can connect to via both several wired and wireless means for any length of time. Additionally, dedicated hardware may connect permanently to the device, although it is not necessary that such hardware should reside in the same location as the main device. Depending on the user, the event, or the requirement, the main server style device can connect to each of its accessories and to multiple main servers through a private dedicated channel or through a custom created channel. Should two or more main servers exist on the same network they may, depending on users requirements, split the workload evenly, in some user specified fraction, or automatically based on load and location for any given collaboration event.

The main server software package is hosted on the hardware device with the users only accepting a terminal style application. The terminal style application is intended to not require any software to be installed on the user's device which cannot be used with other applications unrelated to this invention. For example, Java Console (Java is a trademark of Sun Microsystems) may be needed to run the terminal application on the user's device, and the user may choose to install it on their device, but the same java console can be used elsewhere, may have been previously installed by the user for a different application, and is by no means permanently customized by this invention.

In some embodiments, the main user terminal application is a non specified internet browser. The main server is similar to a web page server. Depending on the device requirements different terminal applications might be required including an "app" which can be downloaded through the device manufacturers' store. However this is considered a rare event. More often than not, the information dissemination will be reconfigured on-the-fly. So the specific device can use the manufacturer included web browser package.

The main collaboration device contains but is not limited to USB ports, Video Ports, Audio Ports, Power in, and Wired Ethernet LAN ports. The quantity, location, and usage of these ports are typical of their common functionality and any port can be added or subtracted depending on the product configuration without affecting the spirit of the invention. Main servers, power accessories, location beacons, and any other accessory directly related to the main server in the vicinity of each other another can be, but are not limited to, being network aware for firmware or software updates. The firmware or software updates can be run automatically in the background or be triggered by the user.

The usually private network created by the main collaboration device enables file transfer, chat, and other information sharing capabilities commonly utilized on any network. These capabilities are enabled between user devices on the network, even user devices of vastly different makes. For example, through the network, a chat window may be created, accessible across several devices. The main server may also have speech to text functionality in some packaged solutions. Visual room layout with the ability to rotate to the view of the user but not limited by its pictorial dimension (2D or 3D) nor its ability to rotate is also made available to the user. The visual room layout may include, but is not limited to, interacting with the information obtained by a location beacon accessory, discussed below. Individual users also have the ability to determine their own location within the visual room layout. The visual room layout and user configurations discussed herein can be customized by the user using an included environmental builder, be customized by an outside agency, or use a default out-of-box configuration.

A user may transfer file(s) to a specific device, many devices, to a general share area, or to a document queue. For example, an instructor may distribute an identical document to all devices in a classroom at the beginning of a lesson. Students, on the other hand, may submit a homework assignment electronically to a document queue at the beginning of class. Participants in a class science laboratory may submit their results to a common electronic location so as to make those results accessible to the entire class. In a more professional setting, such as an office meeting, it would also be desirable to send information and messages to only a select person or number of for whom such information has particular relevance.

As the participants of different kinds of gatherings where the present invention would be used vary, various setting routines are provided. There are four basic settings: Business (coffee shop), Active Conference, Active Classroom, and Professional Client. These offer standard settings usually expected in that kind of environment. Active Conference has e-business card labels for computer names where in the coffee shop this is turned off. In Active Conference, users can exchange business cards, download presentations, and wrap the chat conversations/notes into one file for reviewing later. Active Classroom can post questions to other users, teacher speech translated to text automatically, upload and download homework and collect automatic attendance. Professional Client is designed to be more of an intimate setting between a lawyer, banker, doctor, and their clients or opposition as the case may be. Private group chat, audit tracking, and task based applications will take the foreground while some of the other features discussed above will be less emphasized. Each basic configuration can have functionality added or subtracted based on the users' requirements both in purchased functionality and in customized interface applications. The aforementioned is a sampling of the invention's capabilities but is not limited to any of them as described in name, functionality, or basic grouping.

An adaptor can use a configuration to allow the main device or any of its accessories to become a permanent fixture.

The main server devices can be networked together using any of the aforementioned connection methods to create a wired or wireless network which then can connect to an enterprise level server. The enterprise server contains all of the aforementioned connection points with the addition of being able to handle an upgraded firewall, extensive hard drive storage, incoming internet connection from the outside world, and system wide messaging to all users no matter where in the system they happen to be located.

Figure 2A:
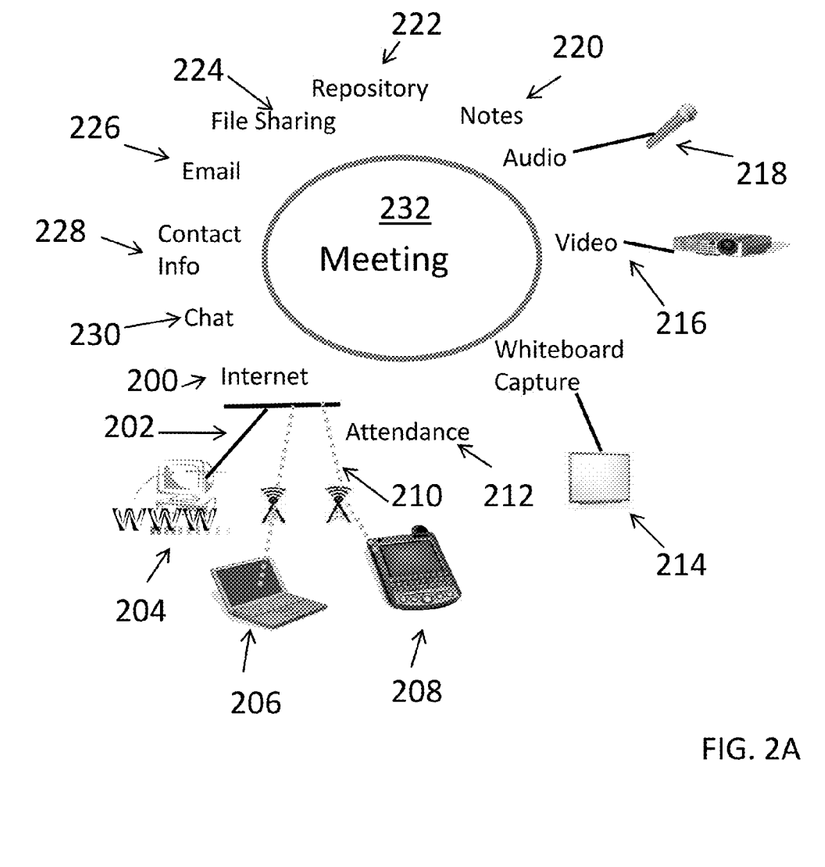
FIG. 2A shows a high-level schematic diagram showing a meeting conducted without an appliance for multi-platform collaboration conferences among many other applications.
Figure 2B:
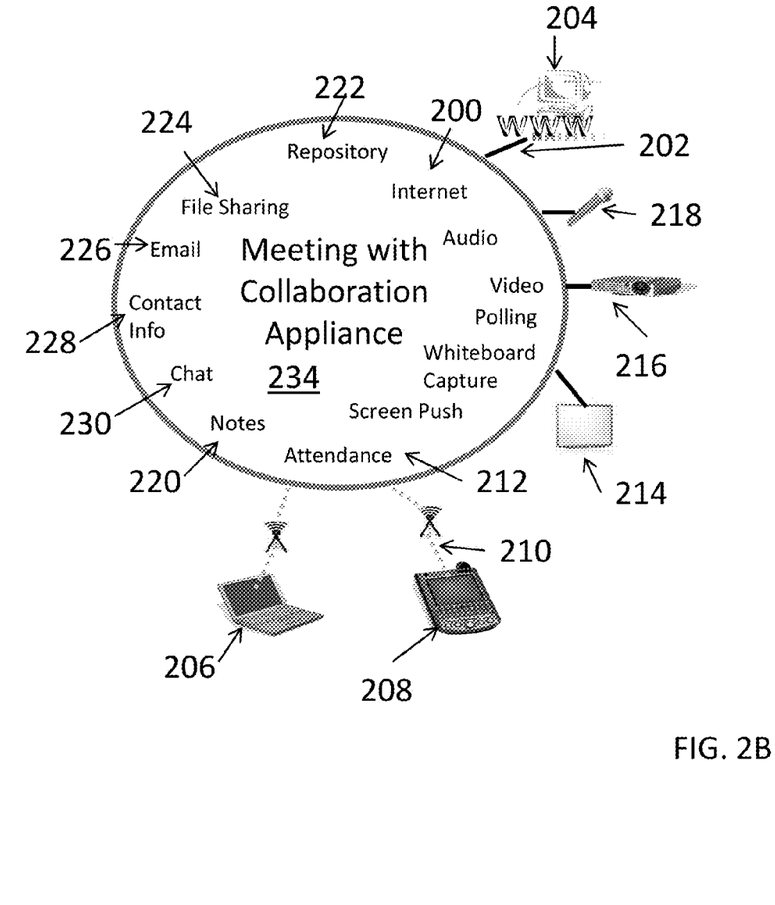
FIG. 2B shows a high-level schematic diagram showing a meeting conducted with an appliance for multi-platform collaboration conferences among many other applications according to an embodiment of the invention.

Referring now to FIGS. 2A and 2B, two high-level schematic diagrams showing a comparison between meeting conducted with and without an appliance for multi-platform collaboration conferences among many other applications according to an embodiment of the invention are shown. Regular meeting 232 lacks the benefit of the present invention. Internet 200 must be accessed individually, thorough an outside source of LAN 202 such as an Ethernet cable to which to plug computer 204, having an Internet browser or wireless hotspot 210 which provides internet access to laptop 206 and PDA 208. While cumbersome, meeting attendance 212 may be taken electronically through the Internet. A presenter may choose several ways of expressing information at meeting 232, including through whiteboard 214, video recordings 216, and audio 218. The devices used to accomplish each are located in the meeting room, but are not integrated together in a system. Participants in the meeting may take notes 220. A digital repository 222 of records of the meeting may also be maintained, along with contact information 228 of the persons participating in the meeting. However, accessing this repository may prove difficult. Communication before, during, and after the meeting will most likely comprise emails 226, as well as file sharing 224 for large amounts of information, and chat 230. However, each of these means of communication operates separately and fails to take into account the wide variety of forms of communications and means of communication employed today. For example, a text message sent on a mobile phone is not quickly received by a computer, while a file shared by a computer may not be of the proper formatting or size to be viewed on a mobile phone.

The meeting with collaboration appliance 234, however, integrates both multimedia and personal electronic devices into a single hub, allowing for faster communication and learning experiences. The collaboration appliance provides a secure wireless hotspot 210 and Internet LAN 200 with options 202 for wired computers. Whiteboard 214, video recordings 216, and audio 218 are also seamlessly integrated into the system. The speed and efficiency of chat 230, email 226, and file sharing 224 are enhanced between user devices plugged into the appliance network. Note taking 220 can be automatically added to repository 222, along with other sources of integrated data, the repository is easily accessed, and thus allows participants to walk away from a meeting with an electric summary of what transpired at the meeting.

Figure 3:
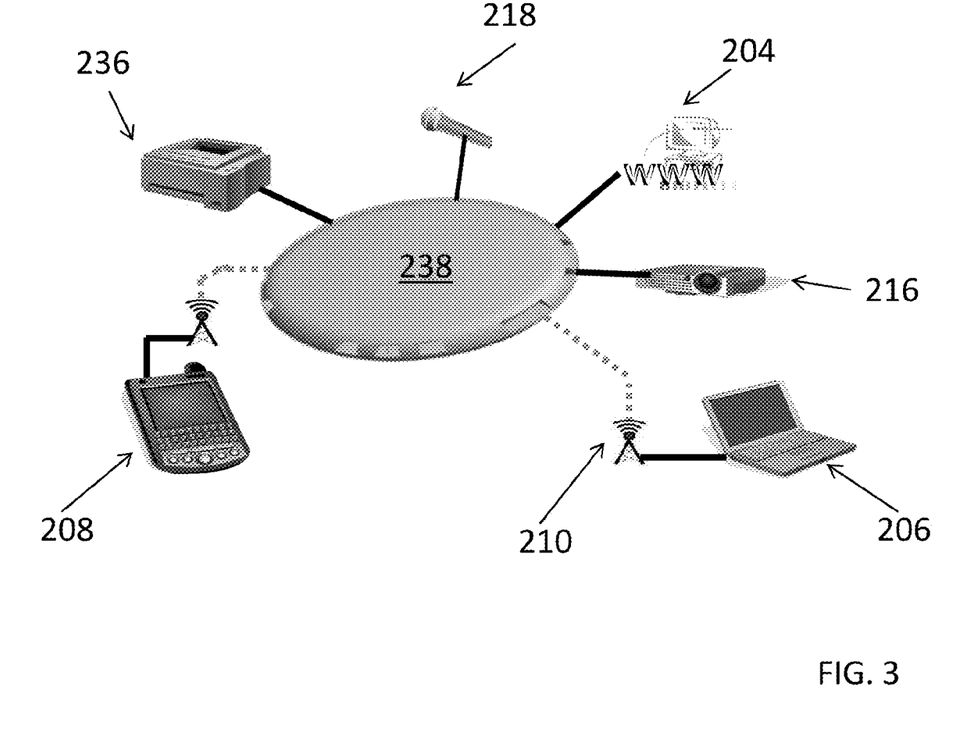
FIG. 3 shows a schematic diagram showing a multi-platform collaboration device in communication with a variety of presentation devices according to an embodiment of the invention.

Referring now to FIG. 3, FIG. 3 shows a schematic diagram showing multi-platform collaboration device 238 in communication with a variety of presentation devices according to an embodiment of the invention. The present invention allows all meeting relating information to be captured by a single tool. During a presentation, a speaker may utilize a variety of multimedia, including video 216 and audio 218, in order to best illustrate the subject being discussed. Tying this multimedia together so that it may be controlled by a central device saves time and resources. In some embodiment of the invention, the collaboration device may have speech to text functionality, the text of which furthermore may be entered into repository 222 (FIG. 2) for later access by participants. Printers 236 and computer access with web browser 204 are also made available to the presenter and participants. The collaboration device provides wireless hotspot 210, allowing a variety of portable digital devices equipped with Wi-Fi and the like to access the network created by the device. Such devices include laptop 206 and PDA 208, although a stationary computer, mobile phones, an electronic reader, or a tablet computer, are other examples.

The device hosts, but is not limited to hosting, both a custom operating system and user interface. The user interface will have several, but not limited to several, profiles which can be customized for different types of customers. The user interface and/or operating system framework can also be hosted from a device that is not specifically mentioned here. The device includes a variety of accessories either directly part of the main device or remotely connected such as, but not limited to, the dynamic power conversion from AC to DC, and a location beacon specifically designed to automatically manage attendees.

The AC/DC is a smart universal power supply which utilizes the main devices dedicated internal network to determine the device to be recharged. With that information, and a universal power post, which is directly plugged into the device via the factory issued power receptacle, the correct power and polarity is supplied to the device without additional user intervention. It is important to note, this device does not use keys or any other physical means to determine the type of device to be recharged. Nor does it require the user to pick his or her device from a master list. In some cases choices from a shortened list may be required to finalize the setup but this is considered a rare event. In other words, the method of determining the output power level as referenced by the power accessory is through either a USB adaptor, another wired connection, or a wireless connection and a corresponding non-intelligent universal power key to fit the device. Due to a limited number of electrical outlets available in most classroom and office settings a daisy chain option can be incorporated into the invention as well. Additionally, power will not be supplied in the fixture until the proprietary connector is securely applied. The proprietary connector cord is a y-type split with a USB connector and a proprietary power connector at one end. The power accessory does not require USB to be fully functional. It may use any of the other main server, power accessory, or location beacon services to determine the device type and thus the correct power requirements. Several proprietary connectors may be required to adequately service all devices in which the power accessory is to interface. The number of proprietary connectors will be limited as much as possible and none will be used to determine the type of the equipment through a physical means.

In addition to the battery charging capabilities for adapters and a location beacon, both accessories contained herein also contain a private self-aware network. The network will use multi-point Bluetooth technology or Wi-Fi access point or Wi-Fi peer to peer, or direct connection, although not limited to this technology, to provide this capability.

The location beacon as mentioned before utilizes measured signal strengths from each device in the vicinity and plots their relative location into the main device based on the known location of each beacon post relative to the main device. At least three main points are needed to determine each location, where an accessory or the main computer itself can be one of these points. In some embodiments, the location beacon accessory utilizes wireless signal strength between known beacon locations in the main server room and the known location of the main server to determine relative user location. Location information can be used to maintain attendance, define the collaboration sessions' boundaries, and many other customized applications.

Figure 4:
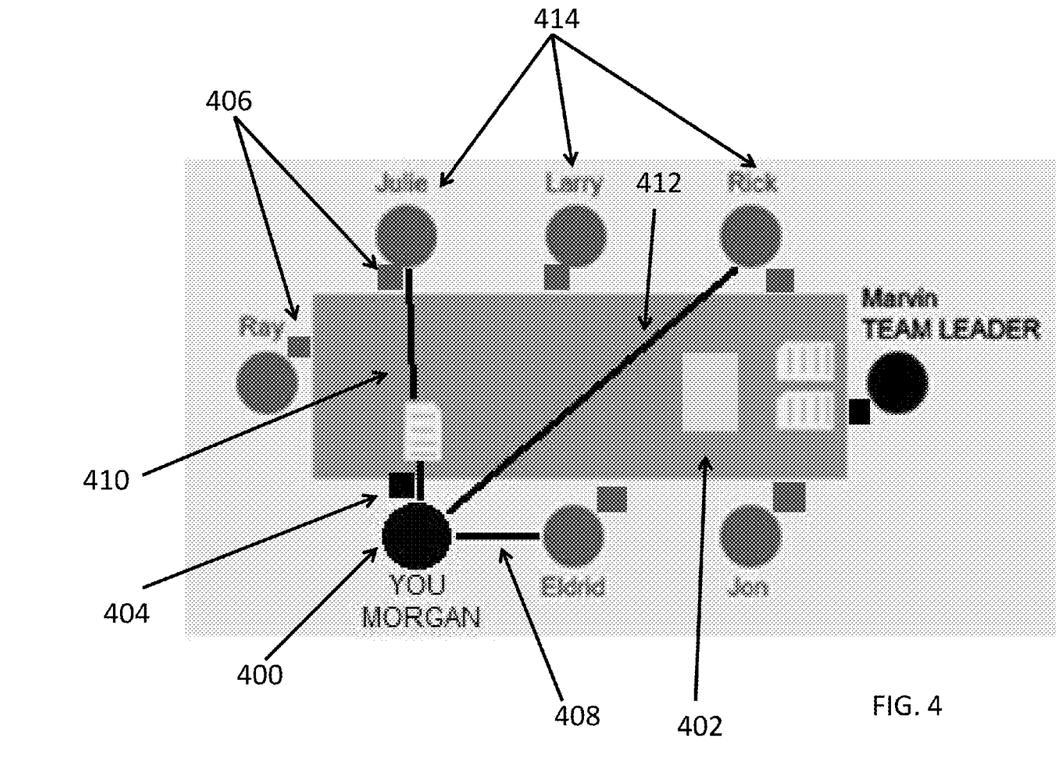
FIG. 4 shows a meeting in which participant's electronic devices are coordinated by a multi-platform collaboration appliance according to an embodiment of the invention.

FIG. 4 shows a meeting in which participant's electronic devices 406 are coordinated by a multi-platform collaboration device 402 according to an embodiment of the invention. It is presumed that each device 406 is of a different make and type and that there is little compatibility between these user devices. Presenter 400, also having user device 404, which in some embodiments may be a computer with a touch screen, gives a presentation to a group of users 414. Presenter 400 sends a document to a user in transmission 410, receives a question from another user in chat 412, and reminds yet another user that his presentation is next in transmission 408, in short succession and in real-time. Thus the meeting proceeds smoothly, without unnecessary interruptions or time delays.

Figure 5:
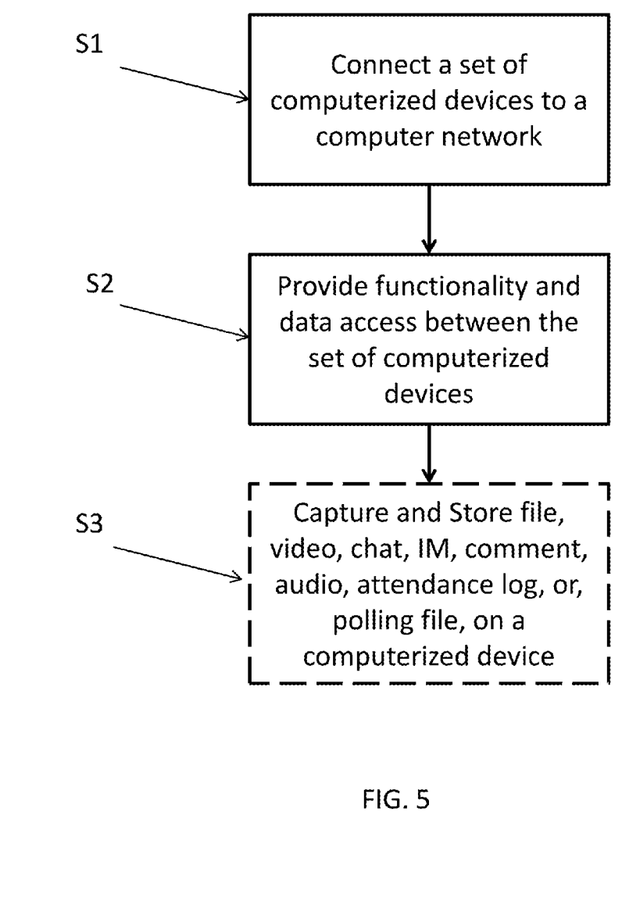
FIG. 5 shows a flow diagram of a method for coordinating the electronic devices and/or multimedia in a meeting according to embodiments of the invention.

Referring now to FIG. 5, a flow diagram of a method for coordinating the electronic devices and multimedia in a meeting according to embodiments of the invention are shown. In step S1, a set of computerized devices are connected to a network operated by the multi-platform collaboration device of the present invention. In step S2, the set of devices is provided with functionality and data access between the set of computerized devices. In an optional step S3, at least one file, video, chat, IM, comment, audio, attendance log, or polling file, is captured and stored on a computerized device.

While shown and described herein as a solution for communicating in a collaboration style application with portable and fixed computer based hardware, it is understood that the invention further provides various alternative embodiments. For example, in one embodiment, the invention provides a computer-readable/useable medium that includes computer program code to enable a computer infrastructure to provide collaboration style application communication with portable and fixed computers functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide collaboration style application communication with portable and fixed computers functionality. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collaboration style application communication with portable and fixed computer hardware. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for communicating in a collaborative application with portable and fixed computer based hardware, comprising:
   directly connecting, for an event, a set of co-located computerized devices, which includes a first computer device having a first operating platform and a second computer device having a second operating platform, into a closed local network via a co-located server having a first connection method and a second connection method, the first computer device connecting to the server via the first connection method and the second computer device connecting to the server via the second connection method;
   establishing, by the server, a terminal connection with each of the set of computerized devices for the event in response to an access, by each of the set of computerized devices, to a main server software package on the server;
   forming a computer network, which includes all of the set of computerized devices that have established the terminal connection, for the event that makes each of the set of computerized devices in the computer network automatically aware of all others of the set of computerized devices in the computer network;
   enabling direct file sharing, data access, data transfer and communications functionality between all of the set of computerized devices in the computer network during the event, the functionality being independent of a set of platforms of the set of computerized devices;
   automatically aggregating, after the event has concluded, integrated data gathered in real time during the event into an event summary, the integrated data including multimedia presentation data for the event, a summary that corresponds to the multimedia presentation data and that is automatically generated from portions of the presentation audio of the event converted to text, and notes that correspond to the multimedia presentation data, the notes being taken during the event on the first and second computer devices by users of the first and second computer devices;
   measuring, using a location beacon, a measured signal strength corresponding to each of the set of computerized devices during the event, all of the set of computerized devices being located in a common meeting area;
   plotting, at the server, location information that includes a relative location of the each of the set of computerized devices based on the corresponding measured signal strength;
   maintaining attendance and defining boundaries of the common meeting area based on the location information;
   generating, using the server in response to a request by a user of a computerized device, a three-dimensional visual representation of a physical room forming the common meeting area that includes a triangulated relative position of each of the set of users and the network within the common meeting area built specifically for the user of the computerized device of the set of connection devices based on the plotting;
   providing the visual representation to the user of the computerized device;
   allowing the user of the computerized device of the set of connection devices to access the visual representation of the each of the set of users and the network from a point of view of the user and to indicate a location of the user within the virtual representation; and rotating, in response to a request by the user, the visual representation with respect to the indicated location.

2. The method of claim 1, where at least one file, video, chat, IM, comment, audio, attendance log, or polling file, is at least one of captured and stored on a computerized device of the set.

3. The method of claim 1, where the main server software package is hosted remotely from the set of computerized devices and customized software is not downloaded on the set of computerized devices.

4. The method of claim 1, where the connecting is via at least one of USB ports, Video Ports, Audio Ports, Power in, and Wired Ethernet LAN ports.

5. The method of claim 1, where firmware and software updates for accessories are triggered by at least one of a user and a computer system.

6. The method of claim 1, further comprising enabling file transfer, chat, and network information sharing capabilities.

7. The method of claim 1, further comprising implementing a setting routine comprising one of: Business (coffee shop), Active Conference, Active Classroom, and Professional Client.

8. The method of claim 1, further comprising:
creating an enterprise level server from two or more computer systems performing the connecting and providing; and
balancing a load between the two or more computer systems resulting from the connecting and providing corresponding to a separate event for each of the two or more computer systems.

9. A system for communicating in a collaboration style application with portable and fixed computer based hardware, comprising:
a bus;
a processor coupled to the bus; and
a memory medium coupled to the bus, the memory medium comprising instructions to:
directly connect, for an event, a plurality of co-located user devices, which includes a first user device having a first operating platform and a second user device having a second operating platform, into a closed local network via a network of the system via a co-located server having a first connection method and a second connection method, the first user device connecting to the server via the first connection method and the second user device connecting to the server via the second connection method;
establish, by the server, a terminal connection with each of the set of computerized devices for the event in response to an access, by each of the set of computerized devices, to a main server software package on the server;
form a computer network, which includes all of the set of computerized devices that have established the terminal connection, for the event that makes each of the set of computerized devices in the computer network automatically aware of all others of the set of computerized devices in the computer network;
enable direct file sharing, data access, data transfer and communications functionality between all of the devices of the plurality in the computer network during the event, the functionality being independent of a set of platforms of the set of computerized devices;
automatically aggregate, after the event has concluded, integrated data gathered in real time during the event into an event summary, the integrated data including multimedia presentation data for the event, a summary that corresponds to the multimedia presentation data and that is automatically generated from portions of the presentation audio of the event converted to text, and notes that correspond to the multimedia presentation data, the notes being taken during the event on the first and second computer devices by users of the first and second computer devices;
measure, using a location beacon, a measured signal strength corresponding to each of the set of computerized devices during the event, all of the set of computerized devices being located in a common meeting area;
plot, at the server, location information that includes a relative location of the each of the set of computerized devices based on the corresponding measured signal strength;
maintain attendance and define boundaries of the common meeting area based on the location information;
generate, using the server in response to a request by a user of a computerized device, a three-dimensional visual representation of a physical room forming the common meeting area that includes a triangulated relative position of each of the set of users and the network within the common meeting area built specifically for the user of the computerized device of the set of connection devices based on the plotting;
provide the visual representation to the user of the computerized device;
allow the user of the computerized device of the set of connection devices to access the visual representation of the each of the set of users and the network from a point of view of the user and to indicate a location of the user within the virtual representation; and
rotate, in response to a request by the user, the visual representation with respect to the indicated location.

10. The system of claim 9, where at least one file, video, chat, IM, comment, audio, attendance log, or polling file, is at least one of captured and stored on a device of the plurality of user devices.

11. The system of claim 9, where the main server software package is hosted on the system and customized software is not installed on a device of the plurality.

12. The system of claim 9, where the system comprises USB ports, Video Ports, Audio Ports, Power in, and Wired Ethernet LAN ports.

13. The system of claim 9, where at least one of the system and a user triggers at least one of firmware and software updates for accessories.

14. The system of claim 9, the memory medium further comprising instructions to enable file transfer, chat, and network information sharing capabilities.

15. The system of claim 9, the memory medium comprising further instructions to implement a setting routine comprising one of: Business (coffee shop), Active Conference, Active Classroom, and Professional Client.

16. The system of claim 9, where the system is server style producing a self-aware network and where the system can be networked with another system to create a network and connect to an enterprise level server.

17. A computer program product for communicating in a collaboration style application with portable and fixed computer based hardware, the computer program product comprising a computer readable storage media and program instructions stored on the computer readable storage media, to:
directly connect, for an event, a plurality co-located of user devices, which includes a first user device having a first operating platform and a second user device having a second operating platform, to a co-located server having a first connection method and a second connection method, the first user device connecting to the server via the first connection method and the second user device connecting to the server via the second connection method establish, by the server, a terminal connection with each of the set of computerized devices for the event in response to an access, by each of the set of computerized devices, into a closed local network via a main server software package on the server;

form a computer network, which includes all of the set of computerized devices that have established the terminal connection, for the event that makes each of the set of computerized devices in the computer network automatically aware of all others of the set of computerized devices in the computer network;

enable direct file sharing, data access, data transfer and communications functionality between all of the devices of the plurality in the computer network during the event, the functionality being independent of a set of platforms of the set of computerized devices;

automatically aggregate, after the event has concluded, integrated data gathered in real time during the event into an event summary, the integrated data including multimedia presentation data for the event, a summary that corresponds to the multimedia presentation data and that is automatically generated from portions of the presentation audio of the event converted to text, and notes that correspond to the multimedia presentation data, the notes being taken during the event on the first and second computer devices by users of the first and second computer devices;

measure, using a location beacon, a measured signal strength corresponding to each of the set of computerized devices during the event, all of the set of computerized devices being located in a common meeting area;

plot, at the server, location information that includes a relative location of the each of the set of computerized devices based on the corresponding measured signal strength;

maintain attendance and define boundaries of the common meeting area based on the location information;

generate, using the server in response to a request by a user of a computerized device, a three-dimensional visual representation of a physical room forming the common meeting area that includes a triangulated relative position of each of the set of users and the network within the common meeting area built specifically for the user of the computerized device of the set of connection devices based on the plotting;

provide the visual representation to the user of the computerized device;

allow the user of the computerized device of the set of connection devices to access the visual representation of the each of the set of users and the network from a point of view of the user and to indicate a location of the user within the virtual representation; and rotate, in response to a request by the user, the visual representation with respect to the indicated location.

18. The computer program product of claim 17, where at least one file, video, chat, IM, comment, audio, attendance log, or polling file, is at least one of captured and stored on a device of the plurality of user devices.

19. The computer program product of claim 17, where the main server software package is hosted on the system and customized software is not downloaded on a device of the plurality.

20. The computer program product of claim 17, where firmware and software updates for accessories are triggered by at least one of a user and a computer system.

21. The computer program product of claim 17, where program instructions stored on the computer readable storage media enable file transfer, chat, and network information sharing capabilities.

22. The computer program product of claim 17, where the computer program product further comprises instructions for a server with a self-aware network and where the server can be networked with another server to create a larger network and connect to an enterprise level server.

23. A method for communicating in a collaboration style application with portable and fixed computer based hardware, comprising:

providing a computer infrastructure being operable to:

directly connect, for an event, a plurality of co-located user devices, which includes a first user device having a first operating platform and a second user device having a second operating platform, to a co-located server having a first connection method and a second connection method, the first user device connecting to the server via the first connection method and the second user device connecting to the server via the second connection method;

establish, by the server, a terminal connection with each of the set of computerized devices for the event in response to an access, by each of the set of computerized devices, into a closed local network via a main server software package on the server;

form a computer network, which includes all of the set of computerized devices that have established the terminal connection, for the event that makes each of the set of computerized devices in the computer network automatically aware of all others of the set of computerized devices in the computer network;

enable direct file sharing, data access, data transfer and communications functionality between all of the devices of the plurality in the computer network during the event, the functionality being independent of a set of platforms of the set of computerized devices;

capture and store integrated data gathered during the event, the integrated data including at least one file, video, chat, IM, comment, audio, attendance log, or polling file, on a device of the plurality of user devices, or block file storage on a device of the plurality of user devices;

automatically aggregating, after the event has concluded, integrated data gathered in real time during the event into an event summary, the integrated data including multimedia presentation data for the event, a summary that corresponds to the multimedia presentation data and that is automatically generated from portions of the presentation audio of the event converted to text, and notes that correspond to the multimedia presentation data, the notes being taken during the event on the first and second computer devices by users of the first and second computer devices;

measure, using a location beacon, a measured signal strength corresponding to each of the set of computerized devices during the event, all of the set of computerized devices being located in a common meeting area;

plot, at the server, location information that includes a relative location of the each of the set of computerized devices based on the corresponding measured signal strength;

maintain attendance and define boundaries of the common meeting area based on the location information;

generate, using the server in response to a request by a user of a computerized device, a three-dimensional visual representation of a physical room forming the common meeting area that includes a triangulated relative position of each of the set of users and the network within the common meeting area built specifically for the user of the computerized device of the set of connection devices based on the plotting;

provide the visual representation to the user of the computerized device;

allow the user of the computerized device of the set of connection devices to access the visual representation of the each of the set of users and the network from a point of view of the user and to indicate a location of the user within the virtual representation; and rotate, in response to a request by the user, the visual representation with respect to the indicated location.

24. The method of claim 23, where a main server software package is hosted on the computer infrastructure and customized software is not downloaded on a device of the plurality.

25. The method of claim 23, where at least one of the infrastructure and a user triggers at least one of firmware and software updates for accessories.

26. The method of claim 23, where the infrastructure is server style producing a selfaware network and where the system can be networked with another infrastructure server to create a network and connect to an enterprise level server.

* * * * *